(12) United States Patent
Coughtry

(10) Patent No.: US 10,377,293 B1
(45) Date of Patent: Aug. 13, 2019

(54) CONTAINER COVERING DEPLOYMENT SYSTEM

(71) Applicant: Richard J. Coughtry, Palm City, FL (US)

(72) Inventor: Richard J. Coughtry, Palm City, FL (US)

( * ) Notice: Subject to any disclaimer, the term of this patent is extended or adjusted under 35 U.S.C. 154(b) by 3 days.

(21) Appl. No.: 15/604,076

(22) Filed: May 24, 2017

(51) Int. Cl.
| | |
|---|---|
| *B60P 7/04* | (2006.01) |
| *B60J 7/10* | (2006.01) |
| *B60J 7/06* | (2006.01) |
| *B60P 7/02* | (2006.01) |
| *B60J 7/14* | (2006.01) |
| *B60J 7/08* | (2006.01) |

(52) U.S. Cl.
CPC .............. *B60P 7/04* (2013.01); *B60J 7/068* (2013.01); *B60J 7/104* (2013.01); *B60J 7/141* (2013.01); *B60J 7/08* (2013.01); *B60J 7/085* (2013.01); *B60J 7/10* (2013.01); *B60P 7/02* (2013.01)

(58) Field of Classification Search
CPC ...... B60P 7/04; B60P 7/02; B60J 7/104; B60J 7/068; B60J 7/141; B60J 7/10; B60J 7/08
See application file for complete search history.

(56) References Cited

U.S. PATENT DOCUMENTS

| | | |
|---|---|---|
| 4,874,196 A | 10/1989 | Goldstein et al. |
| 5,829,818 A | 11/1998 | O'Daniel |
| 6,305,236 B1 | 10/2001 | Sturdevant |
| 7,370,904 B2 | 5/2008 | Wood, Jr. et al. |
| 8,152,216 B2 | 4/2012 | Howell et al. |
| 2015/0307014 A1* | 10/2015 | Alder ................ B60J 7/085 296/98 |

OTHER PUBLICATIONS

Paul Heney, What are hydraulic rotary actuators?, retrieved at: http://www.mobilehydraulictips.com/what-are-hydraulic-rotary-actuators/, Sep. 26, 2012, pp. 1-4
Worm drive, Wikipedia, retrieved at: https://en.wikipedia.org/wiki/Worm_drive, pp. 1-4.

* cited by examiner

*Primary Examiner* — D Glenn Dayoan
*Assistant Examiner* — Melissa A Black
(74) *Attorney, Agent, or Firm* — Glenn E. Gold; Glenn E. Gold, P.A.

(57) ABSTRACT

A container covering deployment system includes a covering deployment device and a pair of worm drive mechanisms. The covering deployment device has a pair of ends pivotally mounted adjacent to opposite sides of a load bed so as to undergo pivotal movement about a transverse axis extending between the opposite sides. Each worm drive mechanism is mounted adjacent to and drivingly coupled with one of the pivotally mounted ends of the covering deployment device so that the worm drive mechanisms are operable to translate rotational drive input motion about respective longitudinal axes extending along the opposite sides and between opposite ends of the load bed into rotational driven output motion about the transverse axis to thereby pivotally actuate the covering deployment device to either draw or withdraw the covering over or from an open-top container on the load bed.

19 Claims, 7 Drawing Sheets

CONTAINER COVERING DEPLOYMENT SYSTEM

FIELD OF THE INVENTION

The present invention relates to covering open containers carried by vehicles, such as trucks and trailers, and, more particularly, is concerned with a container covering deployment system.

BACKGROUND OF THE INVENTION

Many current mechanisms for covering open-top containers on trucks (or trailers pulled by trucks) with tarps utilize a pair of hydraulic cylinders mounted at opposite sides of a truck frame that act directly on a pair of pivotally-mounted arms, at locations along the pivotal arms being intermediate their opposite ends, to actuate pivoting of the pivotal arms in the fore-and-aft direction to deploy the tarp over the open-top container. An example of this mechanism is disclosed in U.S. Pat. No. 4,874,196.

The problem with the aforementioned tarping mechanism approach, which utilizes the pair of hydraulic cylinders to directly act on the pair of pivot arms, is that the pivot arms tend to produce a certain degree of "free fall" as they go over-center to deploy the tarp toward the end of the truck. The free fall in the form of a halting, or jerking, discontinuous motion typically occurs at any of various positions in the arc or swing of the pivot arms, which makes it difficult to stop or start the swing of the pivot arms at a given intermediate position.

As one alternative approach, U.S. Pat. No. 5,829,818 discloses a pair of rack-and-pinion devices each interposed between one of the hydraulic cylinders and one of the pivotal arms. Each rack-and-pinion device has an elongated bar linearly-driven fore-and-aft by the hydraulic cylinders and having a row of teeth thereon that meshes with an arc of gear teeth formed about the pivotally mounted end portion of each of the pivotal arms. This alternative approach may eliminate some of the problems associated with the aforementioned tarping mechanism by increasing the ability to the stop and start the motion of the pivotal arms at any desired intermediate position.

As another alternative approach, U.S. Pat. No. 7,370,904 discloses a pair of pivotal arms pivoted at their lower ends by being rotated by a pair of hydraulic rotary actuators mounted at opposite sides of the truck frame. The rotary actuators are identical to each other and operate independently of each other, that is, there is no rotating shaft or mechanical linkage between them other than the pivotal arms connected by an upper cross member. The lower ends of the pivotal arms are attached, by being bolted, directly to the rotating faces of the rotary actuators.

However, more precise control over the movement of the pivotal arms remains a shortcoming of aforementioned approaches. Accordingly, there remains a need in the art for an innovation that will overcome the limitations of the known prior art and the problems that remain unsolved.

SUMMARY OF THE INVENTION

The present invention is directed to an innovation that overcomes the deficiencies of the known art and the problems that remain unsolved by providing a container covering deployment system mounted proximate to a vehicular load bed and operable to deploy a covering over an open top of a container supported on the load bed. The container coveting deployment system incorporates worm drive mechanisms to actuate pivoting of pivotal arms to deploy the covering, such as a tarp, over the container. The worm drive mechanisms provide more precise control over the movement of the pivotal arms by, first, eliminating the tendency of the pivotal arms to free fall during their pivotal movement and, second, stopping and holding the pivotal arms in any intermediate location along their pivotal movement, when the worm drive mechanisms are not activated, due to built-in lock features of the worm drive mechanisms.

In one aspect of the present invention, a container covering deployment system includes:
  a covering deployment device having a pair of ends pivotally mounted adjacent to opposite sides of a load bed so as to undergo pivotal movement about a transverse axis extending between the opposite sides of the load bed; and
  a pair of worm drive mechanisms each being mounted adjacent to and drivingly coupled with one of the pivotally mounted ends of the covering deployment device such that the worm drive mechanisms are operable to translate a rotational drive input motion about respective longitudinal axes, extending along the opposite sides of the load bed between opposite ends of the load bed, into a rotational driven output motion about the transverse axis to thereby actuate the covering deployment device to either draw or withdraw a covering over or from an open-top container on the load bed.

In another aspect of the present invention, the covering deployment device includes an upper end portion adapted to connect with the covering. The upper end portion includes a cross member connected with the covering so as to support the coveting in a roll form.

In another aspect of the present invention, the covering deployment device includes a pair of opposite side portions laterally spaced apart from one another and being respectively located proximate to the opposite sides of the load bed. Each of the opposite side portions includes a pivotal arm having one of the pivotally mounted ends of the covering deployment device. Each of the pivotal arms has upper and lower portions rigidly interconnected, and extending at an obtuse angle, with respect to one another.

In another aspect of the present invention, each of the worm drive mechanisms includes:
  an annular-shaped helical worm gear having a plurality of spaced apart helical teeth affixed on one of the pivotally mounted ends of the covering deployment device and being rotatable about the transverse axis to thereby pivotally move the covering deployment device about the transverse axis;
  a worm drive shaft having a series of helical screw threads extending about a portion of the worm drive shaft being coupled to the helical teeth on a segment of the annular-shaped helical worm gear of one of the pivotally mounted ends of said covering deployment device, the worm drive shaft being rotatable about one of the longitudinal axes to thereby rotate the annular-shaped helical worm gear about the transverse axis and pivotally move the covering deployment device about the transverse axis; and
  a power control source coupled to an end of the worm drive shaft so as to selectively bi-directionally rotate the worm drive shaft about the one of the longitudinal axes which, in turn, via the series of helical screw threads on the worm drive shaft being drivingly coupled to the segment of the annular-shaped helical worm gear on the one of the pivotally mounted ends of the covering deployment device, rotates the annular-shaped helical worm gear and thereby pivotally moves the covering deployment device about the transverse axis.

In another aspect of the present invention, the power control source of each of the worm drive mechanisms includes one of a hydraulic motor, a pneumatic motor and an electric motor.

In another aspect of the present invention, a container covering deployment system includes:
a covering deployment device including
an upper end portion adapted to connect with a covering, and
a pair of opposite side portions laterally spaced apart from one another and being respectively located proximate to opposite sides of a load bed, each of the opposite side portions having a lower end disposed adjacent to one of the opposite sides of the load bed;
a pair of couplers each mounted at one of the opposite sides of the load bed and located between and spaced from a pair of opposite ends of the load bed, the couplers respectively pivotally supporting the lower ends of the opposite side portions of the covering deployment device for the covering deployment device to undergo pivotal movement about a transverse axis extending between the couplers at opposite sides of the load bed; and
a pair of worm drive mechanisms respectively mounted at the opposite sides of the load bed adjacent to and drivingly coupled with the lower ends of the opposite side portions of the covering deployment device such that the worm drive mechanisms are operable to translate a rotational drive input motion about a pair of longitudinal axes, being aligned with the couplers and extending along the opposite sides of the load bed between opposite ends of the load bed, into a rotational driven output motion of the covering deployment device about the transverse axis extending between the couplers to thereby pivotally actuate the covering deployment device to either draw or withdraw the covering over or from an open-top container on the load bed.

In another aspect of the present invention, a container covering deployment system includes:
a covering deployment device including
an upper end portion adapted to connect with a covering, and
a pair of opposite side portions laterally spaced apart from one another and being located proximate to opposite sides of a load bed, each of the opposite side portions includes a pivotal arm having a lower end disposed adjacent to one of the opposite sides of the load bed;
a pair of couplers each mounted at one of the opposite sides of the load bed and located between and spaced from a pair of opposite ends of the load bed, the couplers respectively pivotally supporting the lower ends of the pivotal arms of the opposite side portions of the covering deployment device for the covering deployment device to undergo pivotal movement about a transverse axis extending between the couplers at the opposite sides of the load bed; and
a pair of worm drive mechanisms respectively mounted at the opposite sides of the load bed adjacent to and drivingly coupled with the lower ends of the pivotal arms of the opposite side portions of the covering deployment device, each of the worm drive mechanisms including
an annular-shaped helical worm gear having a plurality of helical teeth affixed on one of the pivotally mounted ends of the pivotal arms of the opposite side portions of the covering deployment device and being rotatable about the transverse axis to thereby pivotally move the covering deployment device about the transverse axis,
a worm drive shaft having a series of helical screw threads extending about a portion of the worm drive shaft and being coupled to the helical teeth on a segment of the annular-shaped helical worm gear of one of the lower ends of the pivotal arms of the opposite side portions of the covering deployment device, the worm drive shaft being rotatable about a longitudinal axis extending along one of the opposite sides of the load bed between the opposite ends of the load bed, and
a power control source coupled to an end of the worm drive shaft so as to selectively bi-directionally rotate the worm drive shaft about the longitudinal axis which, in turn, via the series of helical screw threads on the worm drive shaft being drivingly coupled to the segment of the annular-shaped helical worm gear on the one of the pivotally mounted ends of the pivotal arms of the opposite side portions of the covering deployment device, rotates the annular-shaped helical worm gears and thereby pivotally moves the pivotal arms of the opposite side portions of the covering deployment device about the transverse axis such that the worm drive mechanisms are operable to translate a rotationally drive input motion about the longitudinal axes, extending along the opposite sides of the load bed between opposite ends of the load bed, into a rotational driven output motion about the transverse axis extending between the couplers to thereby pivotally actuate the covering deployment device to draw or withdraw the covering over or from an open-top container on the load bed.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
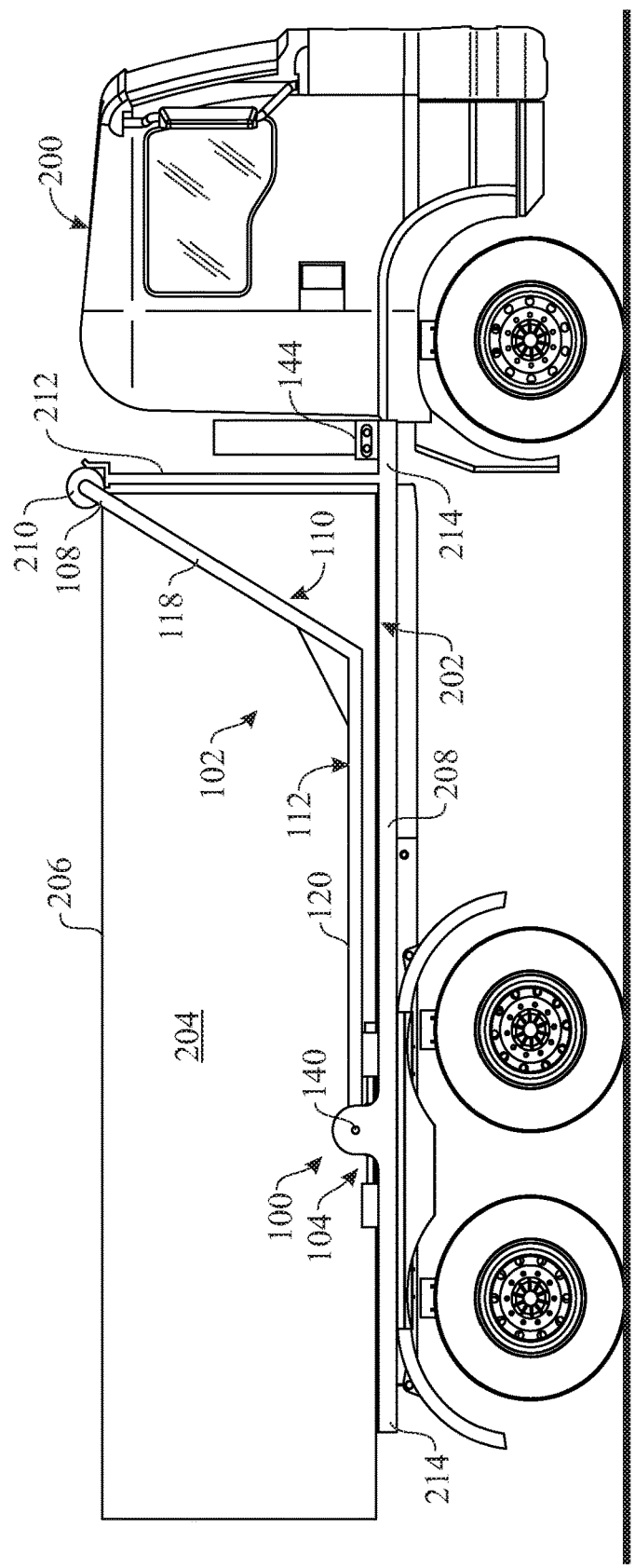
FIG. 1 presents a side elevation view of an exemplary embodiment of a container covering deployment system mounted proximate to a truck load bed and utilizing worm drive mechanisms in accordance with aspects of the present invention for deploying a covering over an open top of a container on the truck load bed.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-6, there is illustrated an exemplary embodiment of a container covering deployment system, generally designated 100, in accordance with aspects of the prevent invention. The container covering deployment system 100 may be mounted on a vehicle 200, such as a truck, proximate to a horizontal load bed 202 thereon carrying a container 204 having an open top 206. Specifically, the container covering deployment system 100 basically includes a covering deployment device 102 and a pair of worm drive mechanisms 104. The covering deployment device 102 transversely spans the load bed 202 and is pivotally mounted proximate to a pair of opposite sides 208 of the load bed 202 to undergo pivotal movement about a transverse axis 106 extending between the opposite sides 208 of the load bed 202. The pair of worm drive mechanisms 104 are drivingly coupled to the covering deployment device 102 and operable to drive the pivotal movement thereof to either draw or withdraw a covering 210, such as a tarp, over or from the open-top container 204 supported on the load bed 202. The covering 210 may be provided in a roll form and supported on the load bed 202 by an upright pedestal 212 located proximate to a forward one of a pair of opposite ends 214 of the load bed.

More particularly, the covering deployment device 102 of the system 100 includes an upper end portion 108 adapted to connect with the covering 210. The upper end portion 108 may include a cross member (not shown) supporting the covering 210 in the roll form. The covering deployment device 102 also includes a pair of opposite side portions 110 laterally spaced apart from one another and being located proximate to the opposite sides 208 of the load bed 202. Each of the opposite side portions 110 includes a respective pivotal arm 112. The pivotal arms 112 have respective upper ends 114 coupled with opposite ends of the cross member-supported roll of covering 210. The pivotal arms 112 also have respective lower ends 116 pivotally mounted adjacent to the opposite sides 208 of the load bed 202 at locations between and spaced from opposite ends 214 of the load bed so as to enable the covering deployment device 102 to undergo pivotal movement about the transverse axis 106 to either draw or withdraw the covering 210 over or from the open-top container 204. Also, each of the pivotal arms 112 has upper and lower portions 118, 120 being rigidly interconnected, and extending at an obtuse angle, with respect to one another.

Figure 2:
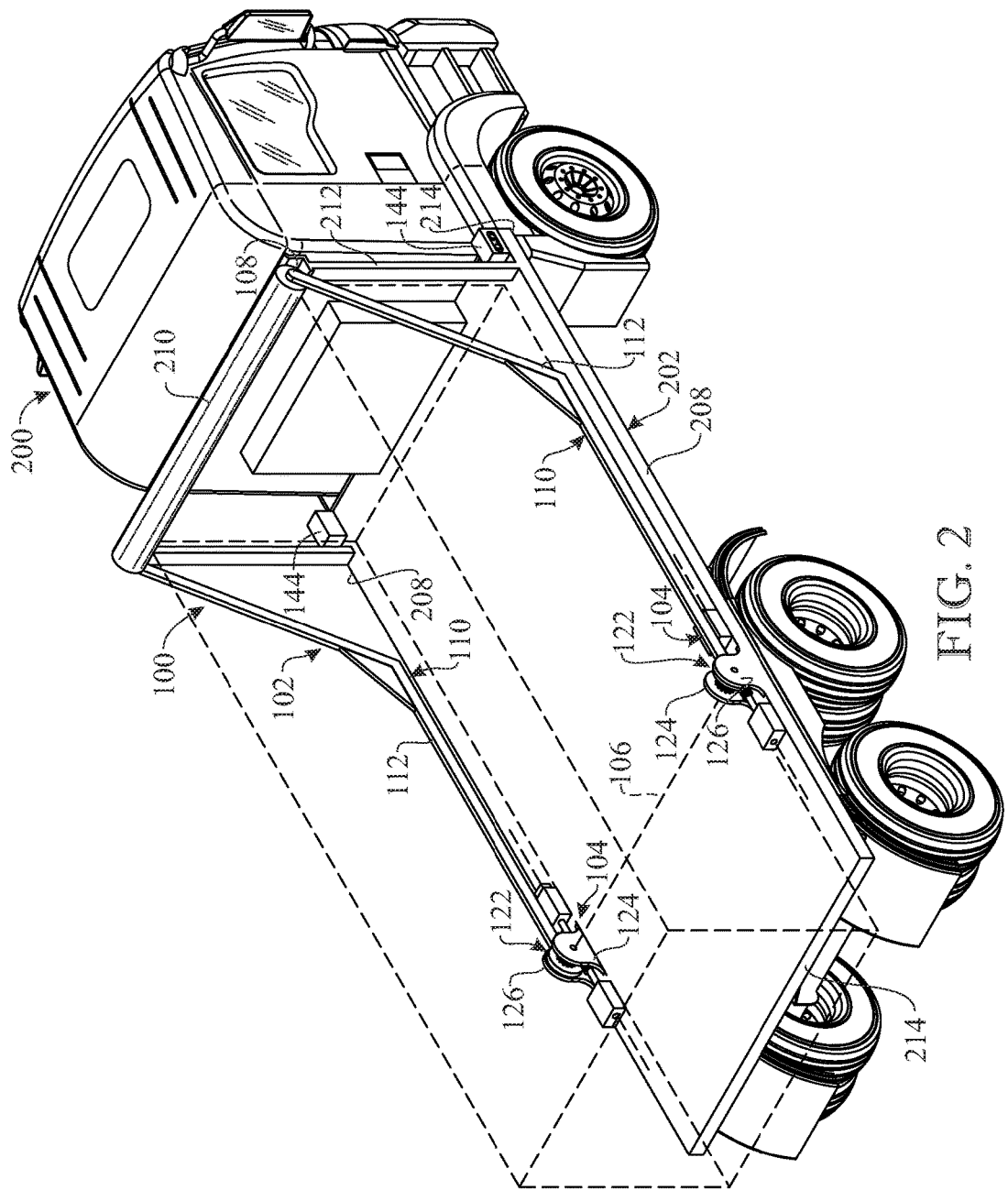
FIG. 2 presents an upper rear isometric view of the container covering deployment system on the truck load bed, as originally introduced in FIG. 1.
Figure 7:
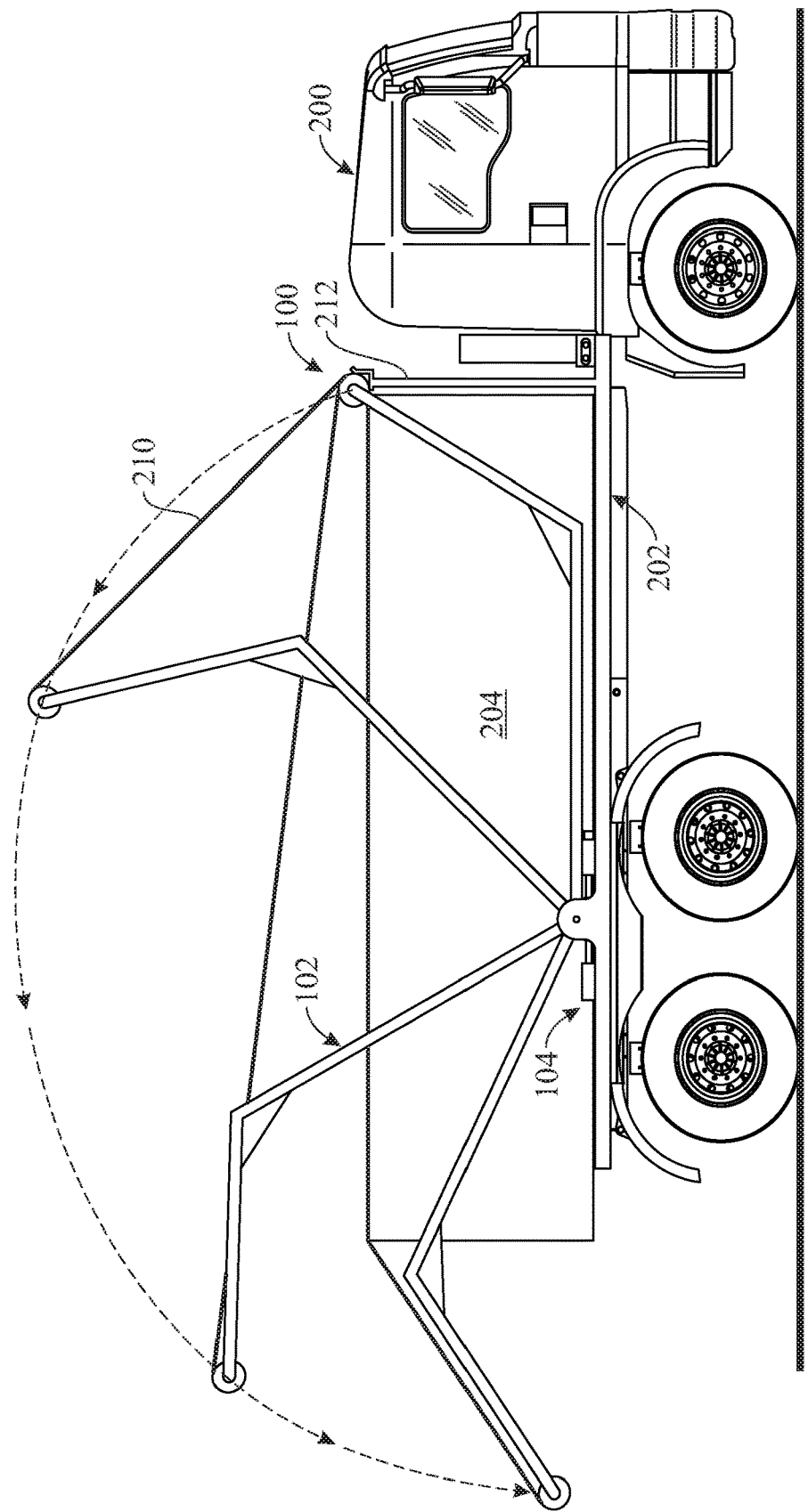
FIG. 7 presents a side elevation view of the container covering deployment system, as originally introduced in FIG. 1, being shown at successive stages of its operation.

As seen in FIGS. 1, 2 and 7, the container covering deployment system 100 also may include a pair of couplers 122 each mounted at one of the opposite sides 208 of the load bed 202 and located between and spaced from the opposite ends 214 thereof. Each coupler 122 may take the form of a pair of inner and outer planar plates 124, 126 being laterally spaced apart from one another, affixed upright upon the load bed 202 at one of the opposite sides 208 thereof, and defining the transverse axis 106.

The worm drive mechanisms 104 of the system 100 are respectively mounted adjacent to and coupled with one of the pivotally mounted lower ends 116 of the pivotal arms 112 of the covering deployment device 102. The worm drive mechanisms 104 are operable to translate a rotational drive input motion about a pair of longitudinal axes 128, extending along the opposite sides 208 and between the opposite ends 214 of the load bed 202, into a rotational driven output motion of the covering deployment device 102 about the transverse axis 106 defined between the pair of couplers 122, being in a transverse or perpendicular to the pair of longitudinal axes 128, to thereby actuate the covering deployment device to either draw or withdraw the covering 210 over or from the open-top container 204, as depicted in FIG. 7.

More particularly, as shown in FIGS. 3-6, each of the worm drive mechanisms 104 includes an annular-shaped helical worm gear 130, a worm drive shaft 132 and a power control source 134. The annular-shaped helical worm gear 130 has a plurality of circumferentially spaced helical teeth 136 affixed on the pivotally mounted lower ends 116 of the pivotal arms 112 of the covering deployment device 102 and rotatable about the transverse axis 106 with pivoting of the pivotal arms 112 to thereby pivotally move the covering deployment device 102 about the transverse axis.

Figure 3:
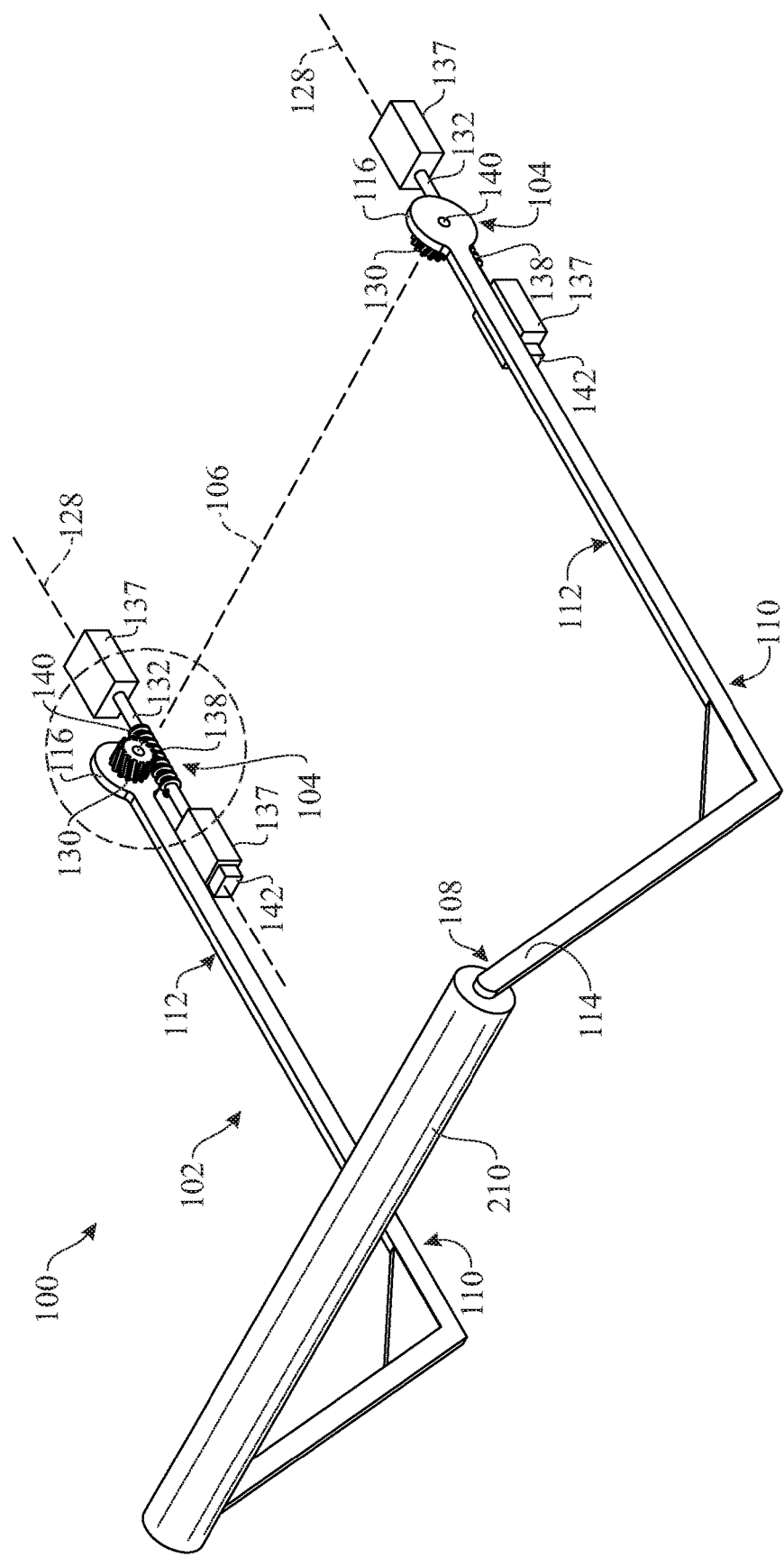
FIG. 3 presents an upper front isometric view of the container covering deployment system, as originally introduced in FIG. 1, being shown removed from the truck load bed.
Figure 4:
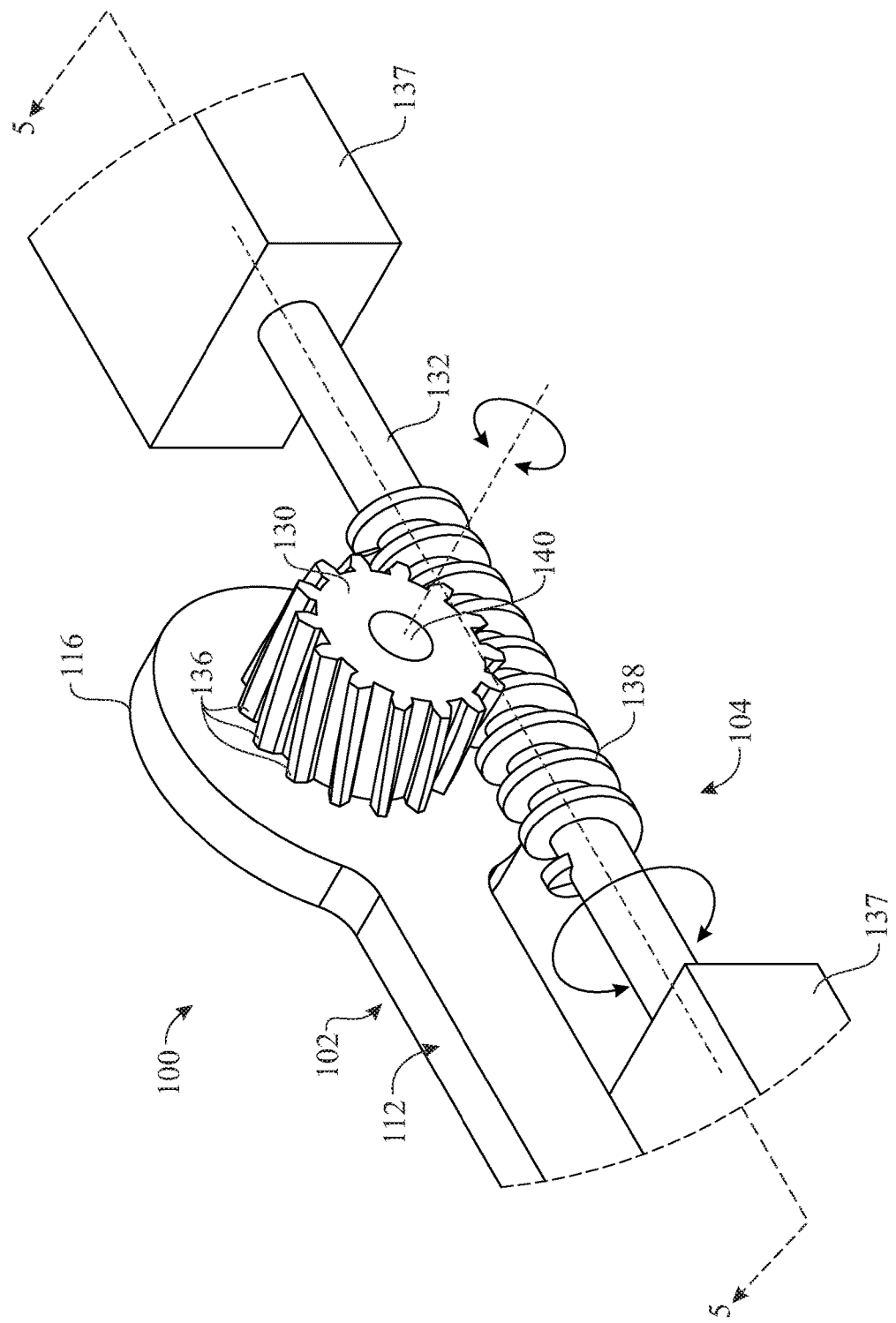
FIG. 4 presents an enlarged fragmentary isometric view of a portion of the container covering deployment system enclosed by the dashed circle A shown in FIG. 3.
Figure 5:
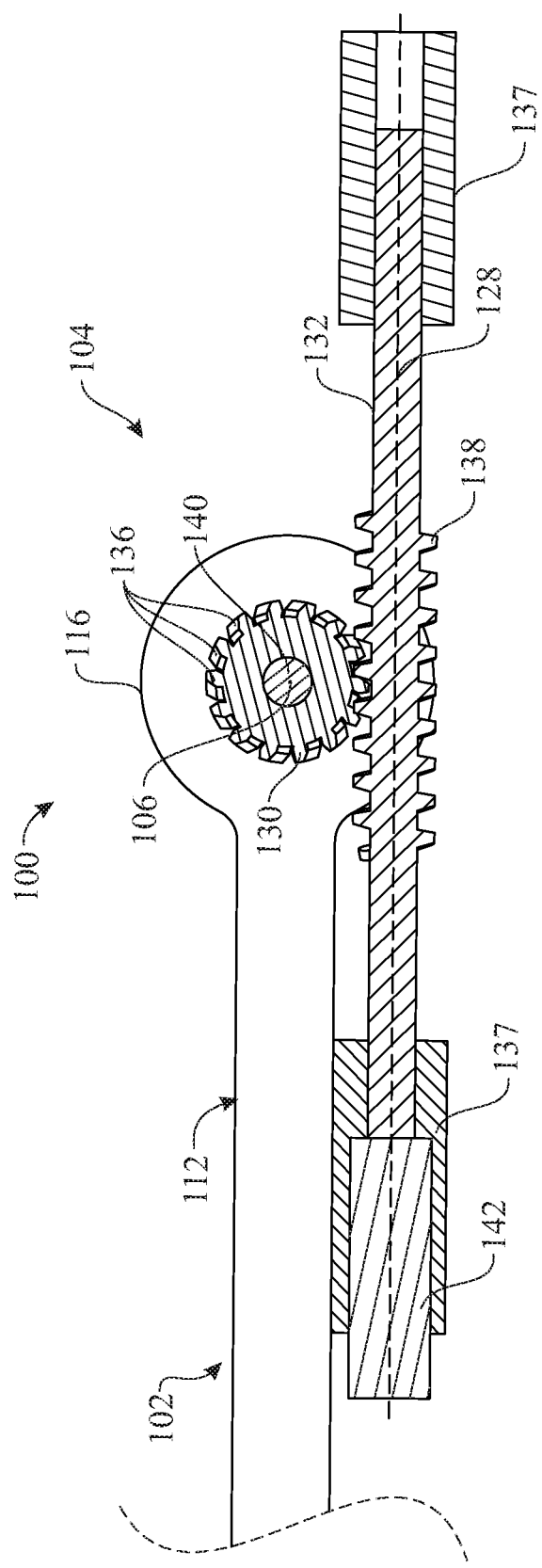
FIG. 5 presents a longitudinally sectioned view of one of the worm drive mechanisms of the container covering deployment system, as seen along section line 5-5 in FIG. 4.

The worm drive shafts 132 are rotatably mounted by and extend along the longitudinal axes 128 between a pair of blocks 137 mounted on each of the opposite sides 208 of the load bed 202. Each worm drive shaft 132 has a series of helical screw threads 138 affixed thereon, extending about a portion of the worm drive shaft and being coupled to the helical teeth 136 of a segment of annular-shaped helical worm gear 130, as best seen in FIGS. 3-5, on a respective one of the pivotally mounted lower ends 116 of the pivotal arms 112. The helical screw threads 138 on the worm drive shaft 132 drivingly couple with the annular-shaped helical worm gear 130 on each lower end 116 of the pivotal arms 112 between the pair of laterally spaced apart inner and outer plates 124, 126 of each one of the couplers 122 that support a transverse pin 140 pivotally mounting the pivotal arms 112 at their lower ends and defining the transverse axis 106 extending therebetween.

The power control source 134 includes a pair of power sources 142, which may be any one of a hydraulic motor, a pneumatic motor or an electric motor. Each power source 142 is drivingly coupled to an end of one of the worm drive shafts 132 so as to rotate the worm drive shaft about a corresponding one of the longitudinal axes 128. The series of helical screw threads 138 on the worm drive shafts 132 being drivingly coupled to helical teeth 136 on the segments of the annular-shaped helical worm gears 130 on the pivotally mounted lower ends 116 of pivotal arms 112 of the covering deployment device 102, rotates the annular-shaped helical worm gears and thereby pivotally moves the covering deployment device about the transverse axis 106. Only one direction of pivotal movement of the pivotal arms 112 to extend the covering 210 over the open-top container 204 is shown in FIG. 7. The covering roll may be spring biased to roll-up the covering 210 as the pivotal arms 112 are pivotally moved in the opposite direction to retract the covering 210 from over the open-top container 204.

Figure 6:
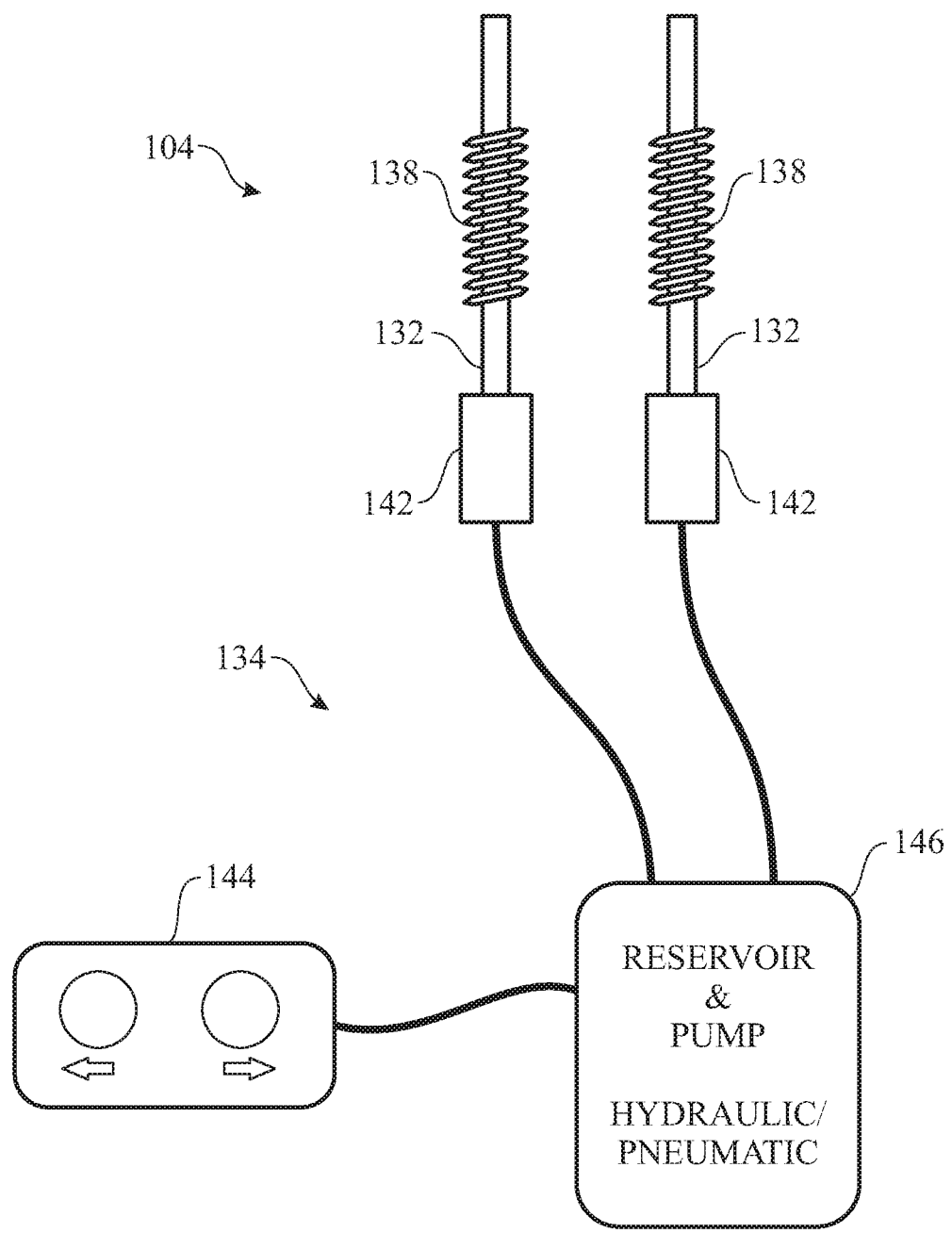
FIG. 6 presents a schematic view of the container covering deployment system.

As schematically depicted in FIG. 6, in the case where either hydraulic or pneumatic power is utilized, the power control source 134 may include a user-operated bi-directional switch 144 which controls the operation of a hydraulic or pneumatic pump 146 to activate rotational input to the power source 142 and thereby to the worm drive shafts 132 in clockwise or counterclockwise directions which correspondingly actuates the direction of pivoting of the pivotal arms 112.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A container cover deployment system, comprising:
   a covering deployment device having a pair of spaced-apart pivotal arms including respective upper end portions supporting a roll of cargo covering material extending laterally therebetween, and respective lower end portions pivotally mounted to corresponding couplers adjacent to opposite sides of a load bed so as to restrict movement of said pair of spaced-apart pivotal arms to non-linear, rotational movement about a transverse axis extending between corresponding pins of the couplers, a free end of said roll of cargo covering material coupled to an upright pedestal extending vertically upwards at a front end of said load bed; and
   a pair of worm drive mechanisms each mounted adjacent to and drivingly coupled with a lower end of a respective one of said pivotally mounted ends of said covering deployment device such that said worm drive mechanisms are operable to translate a rotational drive input motion about respective longitudinal axes, extending along the opposite sides of the load bed between opposite ends of the load bed, into a rotational driven output motion about said transverse axis to thereby actuate said covering deployment device to either draw or withdraw a covering over or from an open-top container on the load bed.

2. The system of claim 1 wherein said upper end portion of said covering deployment device includes a cross member connected with the covering so as to support the covering in a roll form.

3. The system of claim 1 wherein said covering deployment device comprises a pair of opposite side portions laterally spaced apart from one another and being respectively located proximate to the opposite sides of the load bed, each of said opposite side portions having one of said pivotally mounted ends of said covering deployment device.

4. The system of claim 3 wherein each of said opposite side portions of said covering deployment device includes a pivotal arm having said one of said pivotally mounted ends of said covering deployment device.

5. The system of claim 4 wherein each of said pivotal arms has upper and lower portions rigidly interconnected, and extending at an obtuse angle, with respect to one another.

6. The system of claim 1 wherein each of said worm drive mechanisms comprises an annular-shaped helical worm gear having a plurality of spaced apart helical teeth affixed on one of said pivotally mounted ends of said covering deployment device and being rotatable about said transverse axis to pivotally move said covering deployment device about said transverse axis.

7. The system of claim 6 wherein each of said worm drive mechanisms also comprises a worm drive shaft having a series of helical screw threads extending about a portion of said worm drive shaft being coupled to said helical teeth on a segment of said annular-shaped helical worm gear of one of said pivotally mounted ends of said covering deployment device, said worm drive shaft being rotatable about one of said longitudinal axes to thereby rotate said annular-shaped helical worm gear about said transverse axis and pivotally move said covering deployment device about said transverse axis.

8. The system of claim 7 wherein each of said worm drive mechanisms further includes a power control source coupled to an end of said worm drive shaft so as to selectively bi-directionally rotate said worm drive shaft about said one of said longitudinal axes which, in turn, via said series of helical screw threads on said worm drive shaft being drivingly coupled to said segment of said annular-shaped helical worm gear on said one of said pivotally mounted ends of said covering deployment device, rotates said annular-shaped helical worm gear and thereby pivotally moves said covering deployment device about said transverse axis.

9. The system of claim 8 wherein said power control source of each of said worm drive mechanisms includes one of a hydraulic motor, a pneumatic motor and an electric motor.

10. A container covering deployment system, comprising:
    a covering deployment device comprising
      an upper end portion adapted to connect with a covering, and
      a pair of opposite side portions laterally spaced apart from one another and being respectively located proximate to opposite sides of a load bed, each of said opposite side portions having a lower end disposed adjacent to one of the opposite sides of the load bed;
    a pair of couplers each mounted at one of the opposite sides of the load bed and located between and spaced from a pair of opposite ends of the load bed, said couplers respectively pivotally supporting said lower ends of said opposite side portions of said covering deployment device for said covering deployment device to undergo pivotal movement about a transverse axis extending between said couplers at the opposite sides of the load bed; and a pair of worm drive mechanisms respectively mounted at the opposite sides of the load bed adjacent to and drivingly coupled with said lower ends of said opposite side portions of said covering deployment device such that said worm drive mechanisms are operable to translate a rotational drive input motion from said worm drive mechanisms about a pair of longitudinal axes, being aligned with said couplers and extending along the opposite sides of the load bed between the opposite ends of the load bed, into a rotational driven output motion of said covering deployment device about said transverse axis extending between said couplers to thereby pivotally actuate said covering deployment device to either draw or withdraw the covering over or from an open-top container on the load bed.

11. The system of claim 10 wherein said upper end portion of said covering deployment device includes a cross member connected with the covering so as to support the covering in a roll form.

12. The system of claim 10 wherein each of said opposite side portions of said covering deployment device including a pivotal arm having said lower end pivotally supported by one of said couplers.

13. The system of claim 12 wherein each of said pivotal arms has upper and lower portions rigidly interconnected, and extending at an obtuse angle, with respect to one another.

14. The system of claim 10 wherein each of said worm drive mechanisms comprises an annular-shaped helical worm gear having a plurality of spaced apart helical teeth affixed on one of said pivotally supported ends of said opposite side portions of said covering deployment device and being rotatable about said transverse axis to thereby pivotally move said covering deployment device about said transverse axis.

15. The system of claim 14 wherein each of said worm drive mechanisms also comprises a worm drive shaft having a series of helical screw threads extending about a portion of said worm drive shaft being coupled to said helical teeth on a segment of said annular-shaped helical worm gear of said one of said pivotally supported ends of said opposite side portions of said covering deployment device, said worm drive shaft being rotatable about one of said longitudinal axes to thereby rotate said annular-shaped helical worm gear about said transverse axis and pivotally move said covering deployment device about said transverse axis.

16. The system of claim 15 wherein each of said worm drive mechanisms further includes a power control source coupled to an end of said worm drive shaft so as to selectively bi-directionally rotate said worm drive shaft about said one of said longitudinal axes which, in turn, via said series of helical screw threads on said worm drive shaft being drivingly coupled to said segment of said annular-shaped helical worm gear on said one of said pivotally supported ends of said opposite side portions of said covering deployment device, rotates said annular-shaped helical worm gear and thereby pivotally moves said covering deployment device about said transverse axis.

17. The system of claim 16 wherein said power control source of each of said worm drive mechanisms includes one of a hydraulic motor, a pneumatic motor and an electric motor.

18. A container covering deployment system, comprising:
a covering deployment device comprising
an upper end portion adapted to connect with a covering, and
a pair of opposite side portions laterally spaced apart from one another and being respectively located proximate to opposite sides of a load bed, each of said opposite side portions including a pivotal arm having a lower end disposed adjacent to one of the opposite sides of the load bed;

a pair of couplers each mounted at one of the opposite sides of the load bed and located between and spaced from a pair of opposite ends of the load bed, said couplers respectively pivotally supporting said lower ends of said pivotal arms of said opposite side portions of said covering deployment device for said covering deployment device to undergo pivotal movement about a transverse axis extending between said couplers at the opposite sides of the load bed; and a pair of worm drive mechanisms respectively mounted at the opposite sides of the load bed adjacent to and drivingly coupled with said lower ends of said pivotal arms of said opposite side portions of said covering deployment device, each of said worm drive mechanisms comprising
an annular-shaped helical worm gear having a plurality of helical teeth affixed on one of said pivotally mounted ends of said pivotal arms of said opposite side portions of said covering deployment device and being rotatable about said transverse axis to thereby pivotally move said covering deployment device about said transverse axis,
a worm drive shaft having a series of helical screw threads extending about a portion of said worm drive shaft being coupled to said helical teeth on a segment of said annular-shaped helical worm gear of one of said lower ends of said pivotal arms of said opposite side portions of said covering deployment device, said worm drive shaft being rotatable about a longitudinal axis extending along one of the opposite sides of the load bed between the opposite ends of the load bed, and
a power control source coupled to an end of said worm drive shaft so as to selectively bi-directionally rotate said worm drive shaft about said longitudinal axis which, in turn, via said series of helical screw threads on said worm drive shaft being drivingly coupled to said segment of said annular-shaped helical worm gear on said one of said pivotally mounted ends of said pivotal arm of said opposite side portions of said covering deployment device, rotates said annular-shaped helical worm gears and thereby pivotally move said pivotal arms of said opposite side portions of said covering deployment device about said transverse axis such that said worm drive mechanisms are operable to translate a rotational drive input motion about said longitudinal axes, extending along the opposite sides of the load bed between opposite ends of the load bed, into a rotational driven output motion about said transverse axis extending between said couplers to thereby pivotally actuate said covering deployment device to either draw or withdraw the covering over or from an open-top container on the load bed.

19. The system of claim 18 wherein said power control source of each of said worm drive mechanisms includes one of a hydraulic motor, a pneumatic motor and an electric motor.

\* \* \* \* \*